United States Patent
Mitsuoka et al.

(10) Patent No.: US 7,159,024 B2
(45) Date of Patent: Jan. 2, 2007

(54) STORAGE SYSTEM AND METHOD FOR CONTROLLING THE SAME

(75) Inventors: Yoshio Mitsuoka, Odawara (JP); Katsuhiro Uchiumi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 438 days.

(21) Appl. No.: 10/245,165

(22) Filed: Sep. 16, 2002

(65) Prior Publication Data

US 2003/0154281 A1 Aug. 14, 2003

(30) Foreign Application Priority Data

Feb. 14, 2002 (JP) .............................. 2002-036258

(51) Int. Cl.
*G06F 15/173* (2006.01)

(52) U.S. Cl. .................. 709/225; 710/36; 711/100

(58) Field of Classification Search ................ 709/200, 709/225, 223, 216, 229; 711/111, 202, 148; 370/395, 906; 707/205; 705/1; 713/1, 153
See application file for complete search history.

(56) References Cited

U.S. PATENT DOCUMENTS

| | | | |
|---|---|---|---|
| 5,491,812 A | | 2/1996 | Pisello et al. |
| 5,613,096 A | | 3/1997 | Danknick |
| 5,664,146 A | * | 9/1997 | Bolin et al. .................. 711/115 |
| 5,996,024 A | | 11/1999 | Blumenau |
| 6,044,436 A | * | 3/2000 | Otsuka ......................... 711/112 |
| 6,389,432 B1 | * | 5/2002 | Pothapragada et al. ..... 707/205 |
| 6,412,068 B1 | * | 6/2002 | Nolan et al. .................... 713/1 |
| 6,470,397 B1 | | 10/2002 | Shah et al. |
| 6,553,408 B1 | * | 4/2003 | Merrell et al. ............... 709/213 |
| 6,606,690 B1 | * | 8/2003 | Padovano .................... 711/148 |
| 6,654,830 B1 | * | 11/2003 | Taylor et al. ................ 709/223 |
| 6,766,412 B1 | * | 7/2004 | Bolt ............................ 711/111 |
| 6,880,062 B1 | * | 4/2005 | Ibrahim et al. ............. 711/202 |
| 2002/0191649 A1 | * | 12/2002 | Woodring .................... 370/906 |
| 2003/0115447 A1 | * | 6/2003 | Pham et al. ................. 713/153 |
| 2003/0135385 A1 | * | 7/2003 | Karpoff .......................... 705/1 |
| 2003/0204612 A1 | | 10/2003 | Warren |
| 2004/0233910 A1 | * | 11/2004 | Chen et al. ............... 370/395.5 |

FOREIGN PATENT DOCUMENTS

| | | |
|---|---|---|
| JP | 09-152944 | 6/1997 |
| JP | 09-265355 | 10/1997 |
| JP | 10-199136 | 7/1998 |
| JP | 2000-148651 | 5/2000 |
| JP | 2000-348005 | 12/2000 |

* cited by examiner

*Primary Examiner*—John Follansbee
*Assistant Examiner*—Dustin Nguyen
(74) *Attorney, Agent, or Firm*—Townsend and Townsend and Crew LLP

(57) ABSTRACT

A storage system storing data sending/receiving data to/from a plurality of external devices via a common network. The storage system controls access from the plurality of external devices. The storage system accepts accesses according to different protocols from the plurality of external devices via the common network. The storage system analyzes the protocol from the external devices which accessed through the external interface. The storage system sends/receives data based on the analysis result.

20 Claims, 7 Drawing Sheets

| NAME OF INFORMATION | INFORMATION OBTAINED | SOURCE FOR OBTAINING INFORMATION | MEANS FOR OBTAINING INFORMATION |
|---|---|---|---|
| SUBSYSTEM INFORMATION | DATA | OUT | RMI FUNCTION |
| FAILURE INFORMATION | DATA | OUT | RMI FUNCTION |
| HOST-FAILURE INFORMATION | DATA | IN | HOST COMMAND |
| PATH-DEFINITION INFORMATION | DATA | IN/OUT | RMI FUNCTION/ HOST COMMAND |
| HOST PATH DEFINITION INFORMATION | DATA | IN | HOST COMMAND |
| MONITORING DATA | DATA | IN/OUT | RMI FUNCTION/ HOST COMMAND |
| HOST MONITORING DATA | DATA | IN | HOST COMMAND |
| HOST APPLICATION | DATA | IN | HOST COMMAND |
| | | | |

301, 302, 303, 304

EXAMPLE OF MANAGEMENT INFORMATION DATABASE

FIG. 4

SCSI COMMAND STRUCTURE

| | 7 Bit | 6 | 5 | 4 | 3 | 2 | 1 | 0 |
|---|---|---|---|---|---|---|---|---|
| 0 Byte | Operation Code 28h (Read) | | | | | | | |
| 1 | LUN | | | | | | | |
| 2 | INFORMATION AREA<br>  LBA (upon data access)<br>  or CONTROL INFORMATION (upon management with in-band mode) | | | | | | | |
| 3 | | | | | | | | |
| 4 | | | | | | | | |
| 5 | | | | | | | | |
| 6 | Reserved | | | | | | | |
| 7 | Transfer Length | | | | | | | |
| 8 | | | | | | | | |
| 9 | Control Bytes | | | | | | | |

FIG. 5

INFORMATION AREAS UPON SETTING CONTROL INFORMATION

| | 1 Byte | 2 | 3 | 4 |
|---|---|---|---|---|
| ITEM | CONTROL CODE | PARAMETER 1 | PARAMETER 2 | PARAMETER 3 |
| 1201 INITIA-LIZE | 0xF1 | PROCESSOR NUMBER | DATA ITEM | |
| 1202 SET-TING | 0xF2 | PROCESSOR NUMBER | DATA ITEM | |
| 1203 READ | 0xF3 | PROCESSOR NUMBER | DATA ITEM | VALUE |
| 1204 WRITE | 0xF4 | PROCESSOR NUMBER | DATA ITEM | VALUE |
| | | | | |

FIG. 6

SCSI RESPONSE STRUCTURE (HEADER)

| ID | Length | Processor | Reserved | Date | Length | Reserved |
|---|---|---|---|---|---|---|
| 2 Byte | 2 Byte | 2 Byte | 2 Byte | 2 Byte | 2 Byte | |

FIG. 7

SCSI RESPONSE STRUCTURE (TRACE)

| TRACE ID (1WORD) | TIME STAMP (1WORD) | TRACE INFORMATION (1WORD) | TRACE INFORMATION (1WORD) |
|---|---|---|---|
| TRACE INFORMATION (1WORD) | TRACE INFORMATION (1WORD) | TRACE INFORMATION (1WORD) | TRACE INFORMATION (1WORD) |
| TRACE INFORMATION (Option) | TRACE INFORMATION (Option) | TRACE INFORMATION (Option) | TRACE INFORMATION (Option) |

FIG. 8

TCP (UDP) HEADER STRUCTURE

| 1 | SOURCE PORT | DESTINATION PORT |
|---|---|---|
| 2 | | |
| 3 | | |
| 4 | | |
| 5 | | |
| 6 | | |
| 7 | DATA (such as SNMP/JAVA, iSCSI) | |

FIG. 9

SETTING OF DESTINATION PORT NUMBER

| PORT | INTERFACE | PROTOCOL | ACCESS |
|---|---|---|---|
| 5 0 0 3 | BLOCK STORAGE | i S C S I | DATA/ MANAGEMENT |
| OTHERS(1 6 1) | NETWORK | S N M P | MANAGEMENT |
| (1 0 9 9) | NETWORK | J A V A | MANAGEMENT |
| ( ) | NETWORK | N F S | DATA |
| | | | |
| | | | |

FIG. 10

DATA OF MANAGEMENT INFORMATION DATABASE

| INFORMATION NAME | DATA No. | DATA NAME | VALUE | FUNCTION |
|---|---|---|---|---|
| SUBSYSTEM INFORMATION 01 | 01 | DEVICE PRODUCT No. | 30036 | GetInfo |
| | 02 | DEVICE NAME | DISK400 | |
| | 03 | Firm Ver | 01-01-00/00 | |
| | 04 | Administrator | yamada | |
| | 05 | Nickname | keiri1 | |
| | 06 | Location | JAPAN | |
| ENVIRONMENTAL STATE 02 | 01 | PROCESSOR | OK(0) | GetEnv |
| | 02 | PATH | NG(1) | |
| | 03 | MEMORY | OK(0) | |
| | 04 | DISK | OK(0) | |
| ERROR INFORMATION 03 | | | | GetErr |
| | | | | |
| | | | | |

FIG. 11

STORAGE SYSTEM AND METHOD FOR CONTROLLING THE SAME

CROSS-REFERENCE TO RELATED APPLICATIONS

The present application claims priority upon Japanese Patent Application No. 2002-36258 filed on Feb. 14, 2002, which is herein incorporated by reference.

BACKGROUND OF THE INVENTION

1. Field of the Invention

The present invention relates generally to disk array technology, and more particularly, to a storage control device, a storage system, and a method of controlling the same that can be applied to different storage management procedures.

2. Description of the Related Art

Recently, Storage Area Network (hereafter, abbreviated as SAN) environments are becoming well developed. In a SAN environment, storages with increased capacity and performance are constructed on networks. Also, as various host computers are connected, means for interoperable data interchanging becomes necessary, and the need is increasing for Network Attached Storage (hereafter, abbreviated as NAS) in SAN environments. As a result, a manager which manages and controls a storage in a SAN environment becomes essential.

Connection between a storage and a host computer in a current SAN environment is carried out through Block Storage access of SCSI (Small Computer System Interface) according to Fibre Channel. On the other hand, in a NAS environment, connection is realized through network protocols such as Network File System (hereafter, abbreviated as NFS) over Ethernet. These connections are respectively structured by dedicated networks for connection.

References where such storage management technology is disclosed are found in these documents: Japanese Patent Application Laid-open Publication Nos. 9-265355, 9-152944, 10-199136, and 2000-348005.

Further, among present storage management procedures, there are known the in-band mode and the out-of-band mode. The in-band mode uses a storage interface for connecting with a host computer. The out-of-band mode uses an interface physically and logically different from an interface for acquiring storage data from a host computer.

The mode to be used is determined in order to conform to different purposes and in accordance with the arrangement of host applications and installed interfaces.

Where a storage and a host computer (external device) are connected by Fibre Channel, systems using optical fiber as a medium are largely used. Even with a NAS, connection with optical fiber as a medium is employed for backbone components of an Ethernet.

However, even if the optical fibers are physically the same medium, each is connected with a different purpose. Therefore, since the features, including switches and/or hubs involved, differ, identical media cannot be used.

As regards storage management interface, in the instance of the in-band mode using a host-computer connection interface, there are advantages such as fast acquisition of information via a data transfer interface from a host computer and capability to easily cooperate with an application. However, unless the host computer is in operation, storage management cannot be carried out. In the instance of the out-of-band mode using, for example, a network interface separately from a host-computer connection interface, management can be carried out independently of the host computer, so maintenance can be carried out easily. However, it is necessary to provide a dedicated line separate from the host-computer connection interface. Further, as the acquirable information differs among each of the modes, the manageable information with a cooperating application is limited.

SUMMARY OF THE INVENTION

The present invention has been contrived in view of the above and other problems, and one object is to provide a storage system, storage control device, and a control method therefor that can be applied to different storage management procedures.

To fulfill this object, one aspect of the present invention relates to controlling a storage system that carries out sending/receiving of data to/from a plurality of external devices via a common network so as to control access from the plurality of external devices to a storage apparatus for storing the data, comprising the steps of: accepting access according to different types of protocols from the plurality of external devices via the common network; analyzing the protocol used for the access from the external device accessing through the external interface; and carrying out the sending/receiving of data based on a result of the analysis.

According to one example of the present invention, it is possible to, for example, carry out management of storage and storage data with a single connection network. Thus, by sharing information equipment and the connection network having different purposes, increased efficiency can be achieved in terms of management and resources.

BRIEF DESCRIPTION OF THE DRAWINGS

Preferred embodiments of the present invention will now be described in conjunction with the accompanying drawings, in which:

FIG. 4 is a diagram showing a management-information database in a storage system, being an embodiment of the present invention;

FIG. 5 is a diagram showing a SCSI command structure of control with the in-band mode in a storage system, being an embodiment of the present invention;

FIG. 6 is a diagram showing settings of information areas in the SCSI command structure in FIG. 5;

FIG. 7 is a diagram showing header information of a response in view of a SCSI command request with the in-band mode in a storage system, being an embodiment of the present invention;

FIG. 8 is a diagram showing trace data becoming the result of a response in a storage system, being an embodiment of the present invention;

FIG. 9 is a diagram showing a protocol structure of TCP on the network in a storage system, being an embodiment of the present invention;

FIG. 10 is a diagram showing port settings of TCP protocol in a storage system, being an embodiment of the present invention; and FIG. 11 is a diagram showing an example of another management-information database in a storage system, being an embodiment of the present invention.

DETAILED DESCRIPTION OF THE EMBODIMENTS

Figure 1:
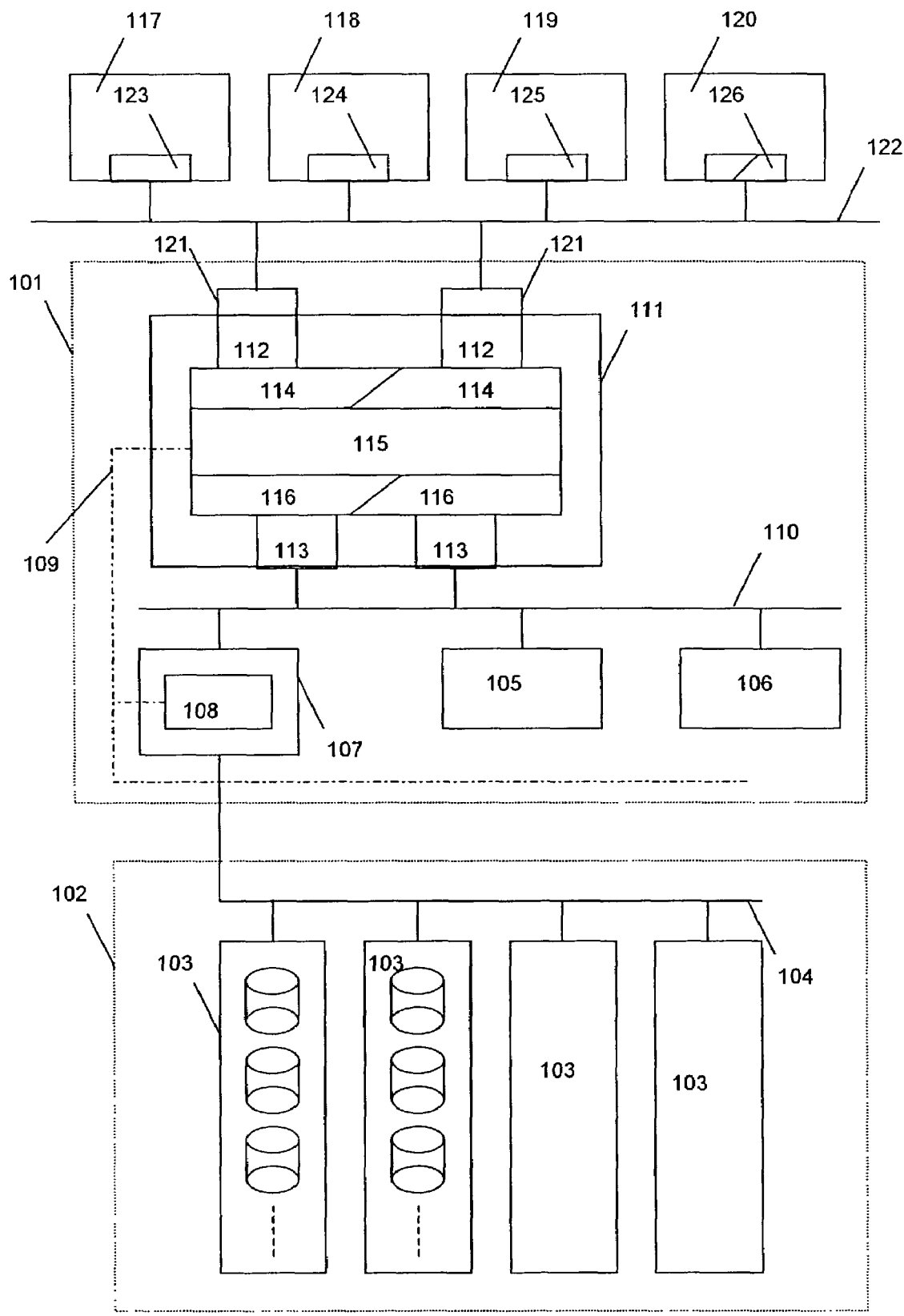
FIG. 1 is a block diagram showing an example of a configuration of a storage system which is an embodiment of the present invention.

Below, referring to the drawings, the embodiments of the present invention are explained in detail.

According to an embodiment of a storage system in accordance with one aspect the present invention, access can be made from the same interface in view of different storage interfaces and different storage management interfaces. As an example, the present system may be especially effective for remote management, among management practices relating to storage systems.

Specific explanation will be made of such a storage system. As shown by the block diagram in FIG. 1, the storage system in accordance with the present embodiment comprises: a disk control device 101 as a storage control device; and a disk drive device 102 as a storage apparatus (or storage). Various clients 117 and 119, a management terminal 118, and other entities are connected to this disk control device 101 via a common equipment network (which is physically the same medium) 122. Networks such as a SAN and/or a LAN may coexist in this common equipment network. A client terminal 120 possessing the functions of the various clients 117, 119 and/or the management terminal 118 is also connected to the disk control device 101 via the common equipment network 122.

The client 117 carries out, to the storage system, block storage access (including management with the in-band mode). The management terminal 118 carries out management with the out-of-band mode from the network. The client 119 accesses the network file system.

The configuration of the storage system 101, 102 is explained specifically. An external interface 121 connected to the common equipment network 122 is attached to the disk control device 101. The disk control device 101 comprises a management section 111 as a data-transfer control section. A shared memory 105, a cache memory 106, and a disk controller 107 are connected to this management section 111 via an internal common bus 110. The disk drive device 102 comprising a plurality of known multiple disk devices is connected to the disk controller 107.

The external interface 121 may comprise: a storage interface provided as a SAN environment; and an Ethernet protocol interface used for network file access for the NAS. The external interface 121 is provided by a physically same connector. Also, the external interface 121 can conform to the block storage access for the storage and for management with the in-band mode, as well as the network access carrying out network file access and management with the out-of-band mode.

The management section 111 comprises: an interface controller 112; a device driver 114; a management processor 115; and a device driver 116. The interface controller 112 conforms to the block storage and network protocols. Also, the device driver 114 conforms to both the block storage and network protocols.

The management section 111 manages and controls the disk drive device 102 and the disk control device 101, and comprises a management section where access is possible from both the in-band mode with SCSI commands which uses the storage interface, and the out-of-band mode by the network protocol.

Here, an example of a data structure of a SCSI command is shown in FIG. 5. As shown in the figure, the data structure comprises, in bits ("7" through "0") of each of the bytes ("0" through "9"), data areas such as: Operation Code 28h (Read); LUN; and an information area including LBA or control information. The specific information areas upon setting the above-mentioned control information is as shown in FIG. 6; a control code and parameters 1–3, which respectively indicate a processor number, a data item, and a value, are respectively set on a byte-by-byte basis in view of items such as initialization, set, read, and write.

Further, the interface controller 112 comprises the device driver 114. The device driver 114 enables access from the various information processing devices 117 through 120 as a block storage interface and an Ethernet interface.

The various information processing devices 117 through 120 connected to a connector of the external interface 121 via the equipment network 122 conform to the aforementioned various types of access via the external interface 121, the interface controller 112, and the device driver 114.

Information specific to each interface acquired from the block storage interface and the Ethernet interface is processed by the management processor 115, and held as a management database in its memory.

The disk drive device 102 in the storage system is recognized as the target disk device in Linux through the disk controller 107 by an operating system (hereafter referred to as OS, Linux (registered trademark) being installed in the present embodiment) operating by the management processor 115 of the management section 111, an initiator controller 113, and the device driver 116.

The OS of the management processor 115 normally has a function of structuring a file system. Thus, it is possible to make disk volumes in the disk drive device 102 be recognized as a local file system. Also, the management processor 115 is able to use a network file system, which is standard to the OS. Therefore, it is possible to carry out file access from the access client 119 connected to the equipment network 122 by the interface controller 112 and its device driver 114.

Further, according to protocols such as SNMP (Simple Network Message Protocol) or JAVA RMI (Remote Method Invocation), which are generally used as a management interface in the out-of-band mode, configuration information of storage system can be accessed via an SNMP service and/or JAVA RMI server incorporated as an OS application when accessed from the management terminal 118.

Further, as regards an access request from the client 117, the OS accesses a disk volume on the initiator controller 113 with the requested SCSI command by block storage protocol iSCSI (Internet SCSI) on the equipment network 122 through the interface controller 112 and a block storage access driver 123.

In addition, in managing with the in-band mode, a vendor-specific SCSI command prepared in beforehand according to the iSCSI protocol is used, and with block storage access, it is possible to refer to and update the management information.

The management-information database is accessible in the same manner as other information from each of the aforementioned management interfaces. This management-information database, as shown in FIG. 11, comprises data such as: information name including such as "subsystem information 01"; data No.; data name; value; and function.

As an example of operation in the above-mentioned storage system shown in FIG. 1, operations for network access and block storage access will be explained referring to the flow charts in FIG. 2 and FIG. 3.

The device driver 114 determines whether the access from the information processing devices 117–120 such as the client is according to the network interface or the block storage interface.

Specifically, when a command from an accessing client is received (Steps 201→202), the TCP header of the network protocol of the command is analyzed, and a destination port number (hereafter referred to as "port No.") is referred to (Step 203).

Here, an example of a structure of a TCP header to be analyzed is shown in FIG. 9. As shown in the figure, the source port and destination port of request, as well as the data type are included in the TCP header. An example of the setting of the destination ports is shown in FIG. 10. As shown in the figure, for each of the port Nos., there may be set items such as: interface indicating network or block storage; types of protocols; and types of access.

If it has been judged that the access is a network-interface access by referring to the port No., the device driver 114 operates as a standard network application program interface (hereafter referred to as API).

The management processor 115 determines whether the received command is a normal network access or a management request through analysis of the protocol (Step 205). If the referred-to port No. indicates that the access is a normal network access (Step 205: No), for example, if the access is a file access from the NAS client 119, the OS of the management processor 115 provides access to the network file system (Step 207).

If the referred-to port No. indicates that the access is a management-interface access according to the out-of-band mode (Step 205: Yes), a management-application program for a general-purpose interface used for management, such as SNMP or JAVA (registered trademark) RMI installed in the OS of the management processor 115, is accessed (Step 205). The OS (Linux) of the management processor 115 having server applications, such as SNMP or JAVA RMI, processes the request from the client 118 and/or 120 (Step 206). That is, in response to this request, the processor 115 refers to and updates the management-information database. In other words, the management processor 115 responds to the clients 118 and/or 120 by referring to and updating the information in the shared memory 105 connected to the common bus 110, or, by acquiring a result for a normal network access, and ends the process (Steps 208→209)

Explanation will be made of an example employing JAVA RMI. By giving a data No. as an argument to the functions shown in FIG. 11 implemented in the RMI interface installed in the OS, the necessary information can be acquired. For example, if GetInfo (03) is called, a value ("01-01-00/00") of "Firm Ver." (firmware version) is acquired as its response value.

Figure 2:
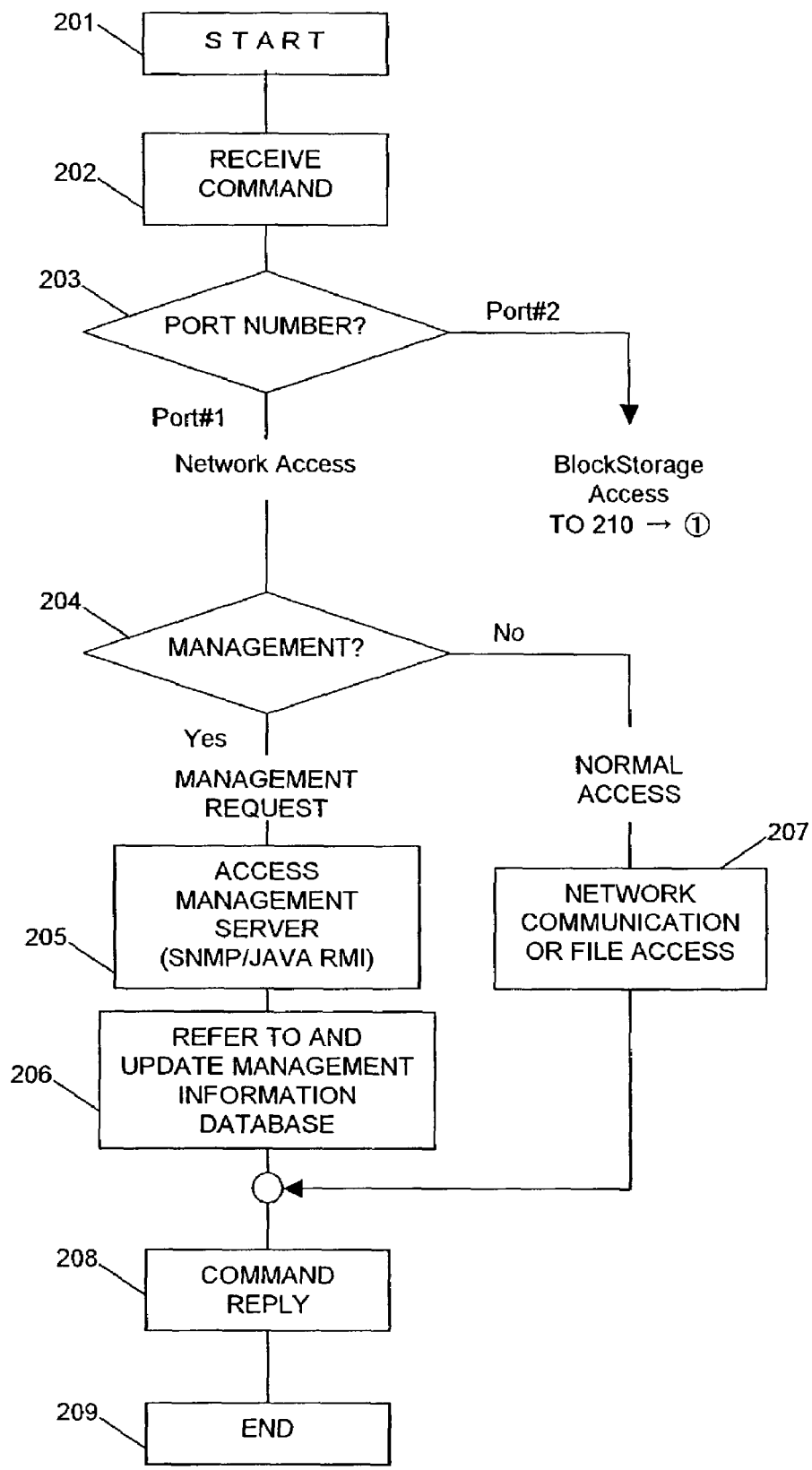
FIG. 2 is a flow chart showing the first-half procedures of an example of operations of a storage system, which is an embodiment of the present invention, in view of access requests from clients.
Figure 3:
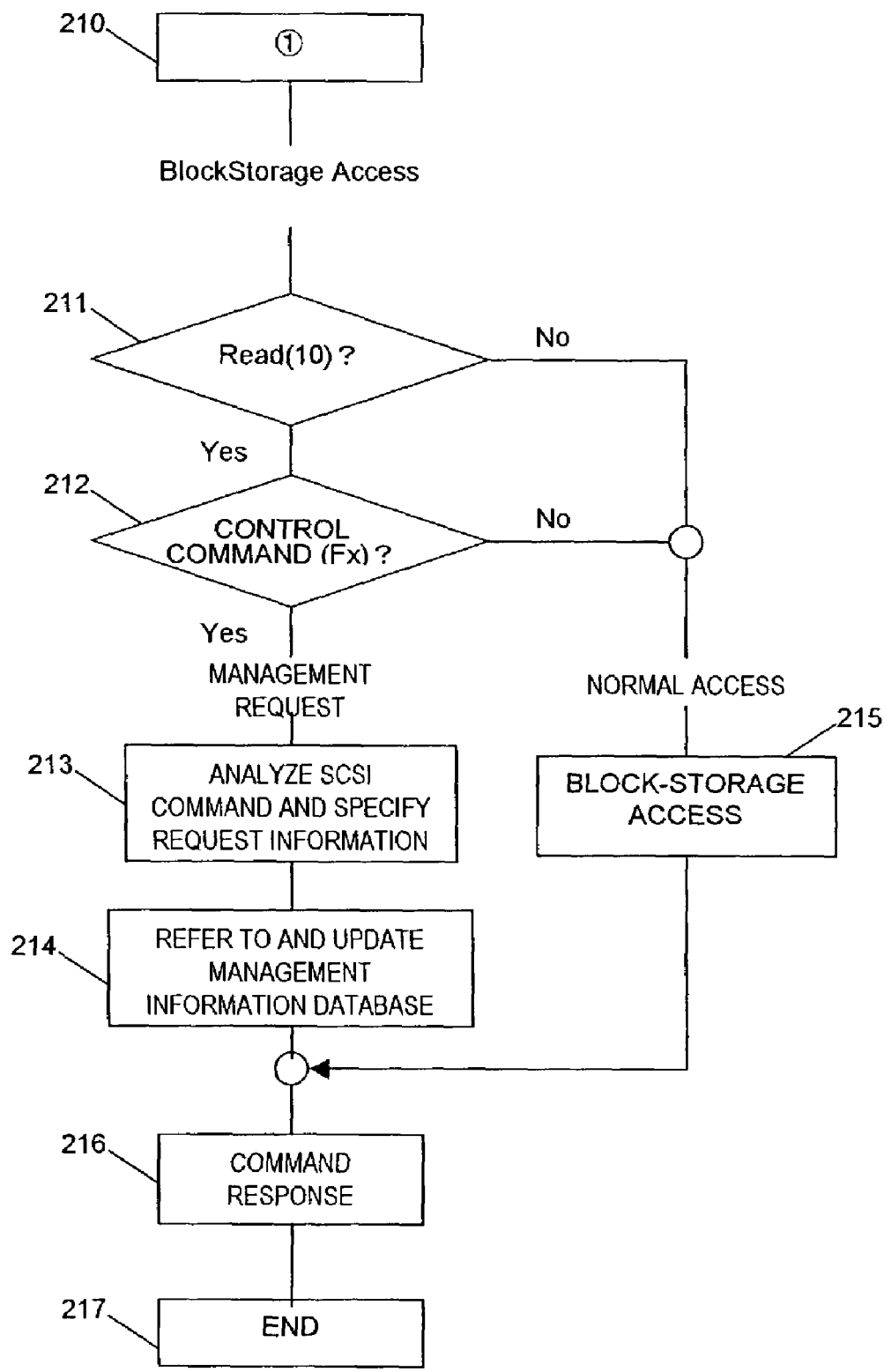
FIG. 3 is a flow chart showing the second-half procedures of an example of operations of a storage system, which is an embodiment of the present invention, in view of access requests from clients.

In contrast, if the port No. indicates the block-storage-interface access according to iSCSI in Step 203 of FIG. 2, a device driver provides block storage API as shown in FIG. 3 (Step 210). Further, the SCSI command of the block storage access refers to a command code and CDB (Step 211) to determine whether it is a normal data access or management according to the in-band mode.

In case the access is a of normal API, that is, if the access is a block-device access as a storage (Step 211: No), the device driver 114 of the interface controller 112 carries out block-device access to a disk volume in accordance with the SCSI command shown in the "0 byte field" in the SCSI command structure shown in FIG. 5 (Step 215).

On the contrary, if the SCSI command shown in 0 byte field in FIG. 5 is "Read (10) Operation Code=28h", processing is carried out to decide whether the access is for management (Steps 211→212).

In addition, in case of a management-interface access according to the in-band mode, vendor-specific commands are prepared in beforehand by setting dedicated information in CDB (Command Descriptor Block) which is a description style of the SCSI command. That is, although the field shown in the second byte (2) through the fifth byte (5) in FIG. 5 is an area which normally designates a device address (LBA) in a Read (10) command, in case a specific address is entered in this field, an identifier for management is registered in the device driver.

The management information processor 115 specifies to which location of the management-information database the access request is accessing (Steps 211, 212), and based on the request, the management information in the shared memory 105 connected to the common bus 110 is referred to and updated (Step 215). That is, in Step 211, if a control code shown in FIG. 6 is entered in the second byte (2)–fifth byte (5) field shown in FIG. 5, the processor 115 carries out management of items corresponding to the control code (Step 212 and after). For example, it is possible to refer to the management-information database in the shared memory 105 by issuing a SCSI command including a "processor number" for specifying the contents of request in order to indicate the external interface from which information is to be obtained, and a data item to be obtained from the management-information database, as shown in FIG. 6, besides "Operation Code=28h and LBA=0xF3" as in the above example (Steps 212→213→214).

In contrast, in case of normal access to the storage system (Step 212: NO), the device driver 116 of the interface controller 113 carries out block-device access to a disk volume in accordance with the SCSI command (Step 215).

Upon access response, in case of a normal access, the requested SCSI data is responded, and the process is ended (Steps 215→216→217). The structure of the responded SCSI-data header is as shown in FIG. 7, and the items regarding Length, Processor, Reserved, Date, and Length, are respectively indicated by a two-byte unit data. Also, a trace structure of SCSI data is as shown in FIG. 8, and the trace is comprised of trace ID, time stamp, and various other trace information. In case of management, the requested data is responded in a format with the header information of FIG. 7 and trace data of FIG. 8, and the process is ended (Steps 214→216→217).

As for the responded data, data with a necessary trace length is responded in accordance with the length of the data registered to the management-information database as well as the transmission length (Length) of the header shown in FIG. 7.

In order to describe an example of operations of the storage system according to the present embodiment, a conceptual diagram is shown in FIG. 4 in which a storage management interface is shared among the in-band mode and the out-of-band mode.

All management information carrying out storage management is constructed in the shared memory 105 connected to the common bus 110. In case of management access according to the in-band mode, the OS in the management processor 115 refers to and updates the shared memory 105 connected to the common bus 110.

In case of the out-of-band mode, the management-information database provided in the OS of the management processor 115 is referred to and updated via general-purpose management interfaces such as SNMP or JAVA RMI. In case of the out-of-band mode, all information is carried out via the operating system of the management processor 115.

The management-information database, as shown in FIG. 4, has the information acquirable per each interface in a list. In addition to information such as the names of acquirable information (301) and obtained information (302), other information such as information specifying which interface, i.e. either the in-band or the out-of-band, can be used for obtaining information (303), means for obtaining information (304), and other necessary information are managed in a centralized manner.

If information is already registered in the management-information database, a response with held information is resultingly processed through the requested interface.

If no information is registered in the management-information database, information that is obtainable from the requested interface is updated in the management-information database in accordance with the method shown in FIG. 2, and a result will be responded.

In order to cope with a case where the requested information is not in the management-information database and cannot be obtained from the requested interface, means can be provided for using a command registered in beforehand in the management-information database and obtaining information from the interface which is capable of obtaining the information, to thereby refer to and update the requested information and send a response.

In case of an out-of-band information request according to the in-band mode, the operating system obtains information according to an out-of-band command, and provides the result of table updating as a result-of-request according to the in-band mode.

On the other hand, in case of an in-band information request according to the out-of-band mode, the operating system obtains information according to an in-band command, and provides the result of table updating as a result-of-request according to the out-of-band mode.

The present invention has been explained specifically based on some of its embodiments. However, the present invention is not limited to those embodiments, and various modifications can be made without departing from the scope of the invention.

According to the present embodiment, a storage system employs an interface controller that uses a block-storage protocol via a network, and comprises means to switch interfaces. Accordingly, it is possible to conform to accesses according to both normal network interface and block-storage interface. Further, since management information is managed in a centralized manner and since means for providing mutual reference and update is employed, it is possible to carry out management from both interfaces with no difference. By enabling handling of logically different interfaces over a physically same medium, such as the equipment network 122, costs in view of system equipment can be reduced. Further, by integrating the storage management interface, management costs can also be reduced.

By unifying the connection manner of the storage system by means of the storage-access interface and the management interface, cost reduction in connection devices and improvement in connectivity with applications can be realized.

What is claimed is:

1. A storage control device for use in a storage system that carries out sending/receiving of data to/from a plurality of external devices via a common network, said storage control device controlling access from said plurality of external devices to a storage apparatus for storing said data, wherein the plurality of external devices include an external device which carries out block I/O access, an external device which carries out file I/O access, and an external device which carries out management-interface access according to out-of-band mode, said storage control device comprising:

an external interface section configured to receive, through a single port, network-interface accesses and block-storage-interface accesses from said plurality of external devices via said common network;

a data-transfer control section that each time receiving an access via said common network, determines whether said access is the network-interface access or the block-storage-interface access depending on a destination port number contained in a TCP header of network protocol of said access, when said access is determined to be the network-interface access, determines whether said access is the management-interface access according to out-of-band mode or the file I/O access based on the destination port number contained in said header of said access, when said access is determined to be the block-storage-interface access, also determines whether said access is the management-interface access according to out-of-band mode or the block I/O access based on the destination port number contained in a destination-port-number field of said TCP header of said access, the block I/O access employing iSCSI technology, and performs said access on the basis of results of the determinations; and a table storing relationships between information included in the destination-port-number field of the TCP header and access types of the external devices;

wherein said plurality of external devices store devices store information which indicates any of the block I/O access, the file I/O access, and the management-interface access according to the out-of-band mode, as the destination port number in said header of said access.

2. A storage control device according to claim 1, wherein said data-transfer control determines the access type of said external device based on said destination port number using the table, and carries out said sending/receiving of data between said storage apparatus and said external device according to said access type.

3. A storage control device according to claim 2, wherein if said access is determined to be a network-interface access, said data-transfer control section further determines whether or not said access is said file I/O access or said management-interface access.

4. A storage control device according to claim 3, wherein if said data-transfer control section determines that said access is said file I/O access, an operating system of a management processor carries out execution of said access with respect to said data.

5. A storage control device according to claim 4, wherein if said file I/O access is a file access from a network attached storage client, said operating system of said management processor carries out execution of said file access to a network file system.

6. A storage control device according to claim 3, wherein said storage control device comprises a shared memory having a management-information database; and
wherein said access is determined to be said management-interface access according to an out-of-band mode, a management-application program installed in an operating system of a management processor updates said management-information database.

7. A storage control device according to claim 2, wherein if said access is determined to be said block-storage-interface access, said data-transfer control section further determines whether or not said access is said block I/O access or said management-interface access according to an in-band mode.

8. A storage control device according to claim 7, wherein if said data-transfer control section determines that said access is said block I/O access, a device driver carries out a block-device access to said storage apparatus.

9. A storage control device according to claim 7, wherein said storage control device further comprises a shared memory having a management-information database; and
wherein if said access is determined to be said management-interface access according to said in-band mode, said data-transfer control section updates said management-information database in said shared memory.

10. A storage control device according to claim 1, wherein the management-interface access according to the out-of-band mode access information including path-definition information, failure information, and monitoring data.

11. A storage system for carrying out sending/receiving of data to/from a plurality of external devices via a common network, wherein the plurality of external devices include an external device which carries out block I/O access, an external device which carries out file I/O access, and an external device which carries out management-interface access according to out-of-band mode, said storage system comprising:
a storage apparatus for storing said data; and
a storage control device for controlling access from said plurality of external devices,
said storage control device including:
an external interface section configured to receive, through a single port, network-interface accesses and block-storage-interface accesses from said plurality of
a data-transfer control section that
each time receiving an access via said common network, determines whether said access is the network-interface access or the block-storage-interface access depending on a destination port number contained in a TCP header of network protocol of said access,
when said access is determined to be the network-interface access, determined whether said access is the management-interface access according to out-of-band mode or the file I/O access based on the destination port number contained in said header of said access,
when said access is determined to be the block-storage-interface access, also determines whether said access is the management-interface access according to out-of-band mode or the block I/O access based on the destination port number contained in a destination-port-number field of said TCP header of said access, the block I/O access employing iSCSI technology, and
performs said access on the basis of results of the determinations; and
a table storing relationships between information included in the destination-port-number field of the TCP header and access types of the external devices;
wherein said plurality of external devices store information which indicates any of the block I/O access, the file I/O access, and the management-interface access according to the out-of-band mode, as the destination port number in said header of said access.

12. A storage system according to claim 11, wherein said data-transfer control section determines the access type of said external device based on said destination port number using the table, and carries out said sending/receiving of data between said storage apparatus and said external device according to said access type.

13. A storage system according to claim 12, wherein if said access type is determined to be said network-interface access, said data-transfer control section further determines whether or not said access is said file I/O access or said management-interface access; and
wherein if said data-transfer control section determines that said access is said file I/O access, an operating system of a management processor carries out execution of said access with respect to said data.

14. A storage system according to claim 13, wherein said storage control device further comprises a shared memory having a management-information database; and
wherein if said data-transfer control section determines that said access is said management-interface access according to an out-of-band mode, a management-application program installed in said operating system of said processor updates said management-information database.

15. A storage system according to claim 12, wherein
if said access type is determined to be said block-storage-interface access, said data-transfer control section further determines whether or not said access is said block I/O access or said management-interface access according to an in-band mode; and
wherein if said data-transfer control section determines that said access is said block I/O access, a device driver carries out a block-device access to said storage apparatus.

16. A storage system according to claim 15, wherein said storage control device further comprises a shared memory having a management-information database; and
wherein if said access is determined to be said management-interface access according to said in-band mode, said data-transfer control section updates said management-information database in said shared memory.

17. A method of controlling a storage system that carries out sending/receiving of data to/from a plurality of external devices via a common network, said method for controlling access from said plurality of external devices to a storage apparatus for storing said data, wherein the plurality of external devices include an external device which carries out block I/O access, an external device which carries out file I/O access, and an external device which carries out management-interface access according to out-of-band mode, said method comprising the steps of:

receiving, through a single port, network-interface access and block-storage-interface accesses from said plurality of external devices via said common network;

each time receiving an access via said common network, determining whether said access is the network-interface access or the block-storage-interface access depending on a destination port number contained in a TCP header of network protocol of said access;

when said access is determined to be the network-interface access, determining whether said access is the management-interface access according to out-of-band mode of the file I/O access based on the destination port number contained in said header of said access, when said access is determined to be the block-storage-interface access, also determining whether said access is the management-interface access according to out-of-band mode or the block I/O access based on the destination port number contained in a destination-port-number field of said TCP header of said access, the block I/O access employing iSCSI technology; and providing a table storing relationships between information included in the destination-port-number field of the TCP header and access types of the external devices;

performing said access on the basis of results of the determinations;

wherein said plurality of external devices store information which indicates any of the block I/O access, the file I/O access, and the management-interface access according to the out-of-band mode, as the destination port number in said header of said access.

18. A method of controlling a storage system according to claim 17, further comprising:

determining the access type of said external device based on said destination port number using the table; and said step of performing said access on the basis of results of the determinations includes:

carrying out said sending/receiving of data between said storage apparatus and said external device according to said access type.

19. A method of controlling a storage system according to claim 18, wherein said step of determining an access type includes the steps of:

if said access is determined to be said network-interface access, determining whether or not said access is said file I/O access or said management-interface access;

if said access is determined to be said file I/O access, making an operating system of a management processor carry out execution of said access with respect to said data; and if said access is determined to be said management-interface access according to an out-of-band mode, making a management-application program installed in said operating system of said management processor update a management-information database.

20. A method of controlling a storage system according to claim 18, wherein said step of determining an access type includes the steps of:

if said access is determined to be said block-storage-interface access, further deciding whether or not said access is said block I/O access or said management-interface access according to an in-band mode;

if said access is determined to be said block I/O access, making a device driver carry out a block-device access to said storage apparatus; and if said access is determined to be said management-interface access according to said in-band mode, making a data-transfer control section update a management-information database in a shared memory.

* * * * *